Feb. 28, 1967  J. F. HECHTMAN  3,306,769
PROCESS FOR MANUFACTURING A LOW DENSITY, FOAM-FIBER PRODUCT
Filed Aug. 2, 1962
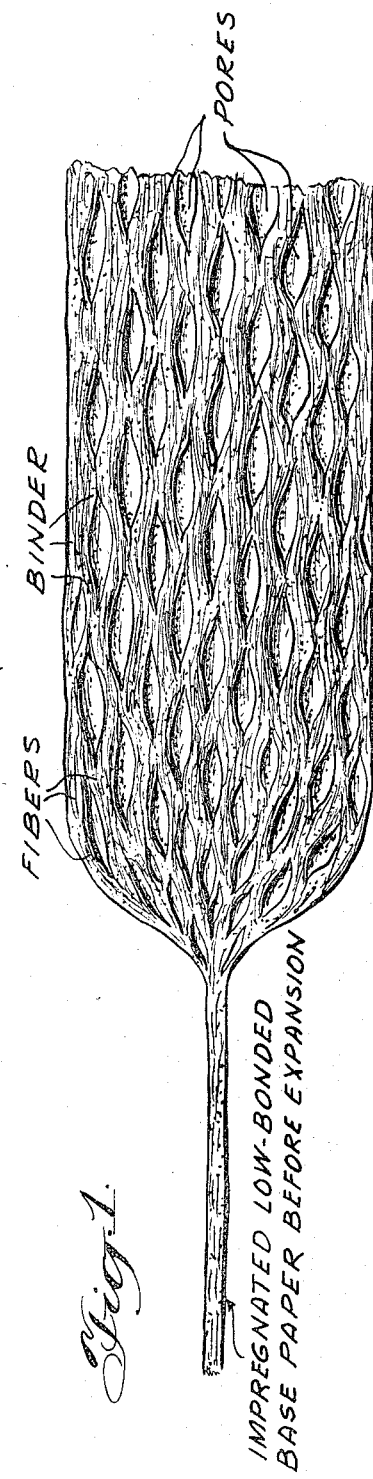
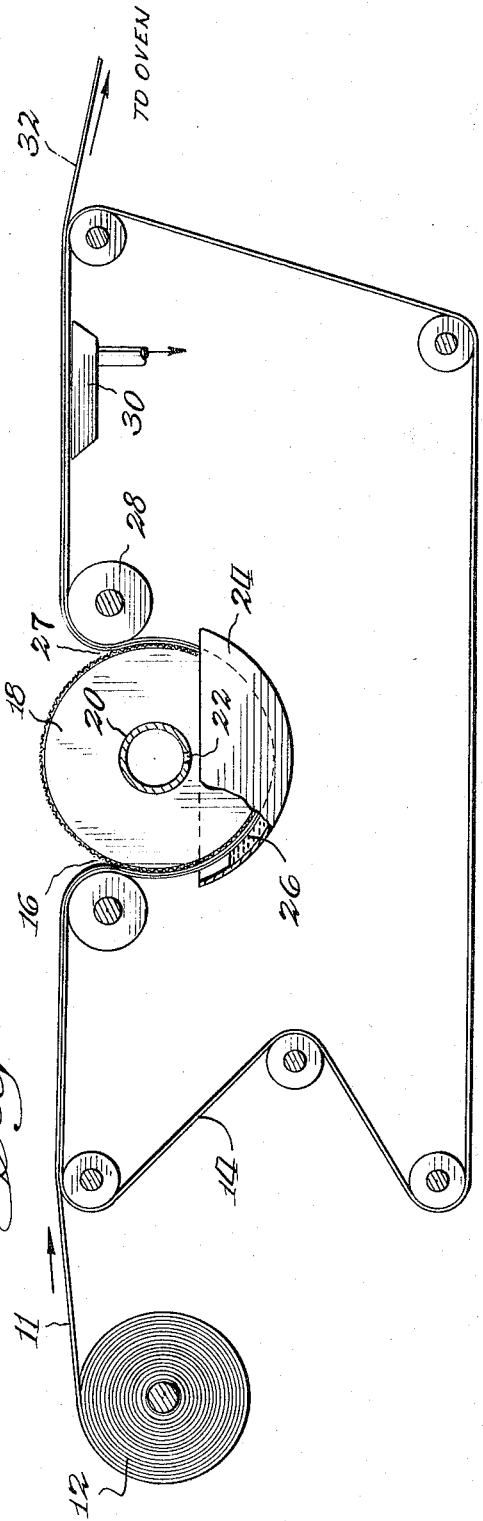

United States Patent Office 3,306,769
Patented Feb. 28, 1967

3,306,769
PROCESS FOR MANUFACTURING A LOW
DENSITY, FOAM-FIBER PRODUCT
John F. Hechtman, Munising, Mich., assignor to Kimberly-Clark Corporation, Neenah, Wis., a corporation of Delaware
Filed Aug. 2, 1962, Ser. No. 214,246
7 Claims. (Cl. 117—119.6)

This invention relates to the manufacture of low density fibrous products and to the improved products obtained.

The principal object of this invention is to provide a resilient low density fibrous product in which substantially discrete, randomly arranged short fibers are encased by and embedded in insolubilized cell walls of a foamed gel-forming material.

A further object is to provide a continuous method for increasing the bulk of a fibrous web by impregnating the web with a wet gel-forming material followed by the in situ expansion and stabilization of the composite structure.

Another object is to provide a resilient, low-density, dimensionally stable foam-fiber product having good sewability and scuff-resistance.

Further objects of the invention will become apparent from the following description, accompanying drawings, and appended claims.

FIG. 1 shows an enlarged cross sectional before and after view of the cellular structure typical of the foam-fiber products obtained by the process of this invention.

FIG. 2 is a schematic representation of apparatus suitable for carrying out the process of this invention.

Low density fibrous web materials of many types have heretofore been manufactured for use in the upholstery, padding, cushioning, and insulation fields. Typical methods of manufacture have been to card or airlay natural or synthetic fibers to form a continuous web, followed by the application of a binder material by impregnation or printing to unify and strengthen the web. Such webs are relatively thin and when plied-up or laminated, produce low density webs with low resilience. Attempts have been made to increase resilience in thicker materials by incorporating stiff natural fibers such as horsehair, sisal and the like, with a corresponding increase in density and loss in softness.

Cellular plastic materials, such as foam rubber and synthetic elastomers, also are employed where low density and good resiliency are required, but fail where sewability and scuff-resistance are demanded. Costs of foamed plastics also run considerably higher than costs of the fibrous materials they replace.

Another method for producing low density materials involves treating a fibrous batt matrix of interbonded textile length fibers with liquid foamable resin and then heating the resin-containing matrix to cause the resin to foam about the fibers of the batt and form a cellular, fiber-reinforced pad. The resulting pads have substantially the same thickness as the original batt matrix due to the restraining influence of the bonded fibers in the base mat structure. If the batt matrix is not pre-bonded and sufficiently resilient to return to its original loft after compression, any compression of the batt during treatment with foamable resin and manipulation thereof in the manufacturing process causes matting or balling of the fibers in the batt, resulting in defects in the finished product. The batt matrix acts as the supporting structure for the resin before foaming and determines the final thickness of the end product.

The present invention overcomes these disadvantages in part and permits the employment of low-bonded webs of randomly arranged fibers to obtain a pad with a uniformly foamed structure whose thickness is not restricted by the initial thickness of the starting web or batt. These results are made possible by impregnating a low-bonded short-fiber web with an aqueous saturant containing (1) a wet gel-forming material such as a soap or similar material capable of forming a soluble film, (2) a heat-reactive gas-forming agent, and (3) an insolubilizing agent for the gel-forming material. The aqueous saturant first releases the majority of inter-fiber bonds in the low-bonded web. Then, when the saturated sheet is heated, the soap solution is foamed by the gas released by the foaming agent and provides a relatively stable formation of uniform cells or bubbles. The gelling agent then sets the cells of the foam by insolubilization in situ to obtain a stable expanded foam-fiber product. When a binding material is included in the saturant and subsequently cured or set, the expanded structure also assumes some of the properties of the binder material.

While the function of the gel-forming material is basic to this invention, the properties and potential end uses of the products may be varied by judicious selection of the binding material employed in the saturant.

Thus, soft elastomeric materials will produce products of flexible structure, harder elastomers will produce semi-rigid structures, and resinous materials will produce products which are semi-rigid to rigid in structure.

Broadly the process includes the steps of forming a low-bonded fibrous web; saturating the low-bonded web with an aqueous binder composition comprising as a minor but critical ingredient thereof a wet gel-forming material such as soap capable of forming a soluble soap film, a heat-reactive gas-forming agent, and a gelling agent; heating the saturated web sufficiently to release the gas from the gas-forming agent to foam the soap solution and to expand the saturated web while providing a gelling agent which sets the foamed soap film in situ by insolubilization; and drying or curing the resulting foamed and expanded product.

In a typical saturant prepared in accordance with this invention, the wet-gel forming foamable material was a fatty acid soap, the gas liberating material was Celogen (trademark for p,p'-oxy-bis (benzenesulfonylhydrazide)), and the soap insolubilizing system was a complex zinc ammonia salt, zinc ammonia sulfate, and a heat-sensitive nonionic soap. The saturated sheet was placed in the moist atmosphere of an oven maintained at an elevated temperature, 190° F. or over, by injecting steam directly into the oven. When the temperature of the saturated sheet increased to a point where the Celogen started to decompose, about 163–5° F., the aqueous phase containing the soap started to foam. Both layers of fibers and individual fibers were separated by the substantially uniform bubbles of the foaming liquid. The aqueous saturant was necessary to hydrate the hydrogen bonds between fibers and enable the bubbles of foam substantially to separate the fibers. A further increase in temperature initiated the soap insolubilization action. The temperature at which this latter action occurs depends in part on the balance of complex salt and nonionic soap employed in the saturant recipe and upon the pH of the saturant recipe. The purpose of the heat sensitive nonionic soap was to protect the foaming material from premature insolubilization. When the nonionic soap clouds over, zinc ions liberated by the disassociation of the zinc ammonia complex caused by thermal degradation, and pH lowering from decomposition of the Celogen and evolution of ammonia from ammonium hydroxide used for pH adjustment, insolubilize the soap micelles sorbed on the cellulose fibers and present in the foam lamallae and mechanically stabilize the foam network. The resultant foam product is believed to be one in which the cellulose fibers are encased in an insoluble soap film and the foam structure is held in place by cellulose-soap-cellulose bonds at fiber crossings and by additional rigidity imparted to the cellulose fibers by the soap casement.

Various polymeric materials can be incorporated into the saturant recipe to impart desirable properties to the foamed sheet. If a rubber latex is used, then the fibers are encased in a rubber-soap layer and the fiber-crossings are stabilized by cellulose, soap-rubber, cellulose bonds. Where in situ foams were prepared in which a rubber latex was incorporated into the saturant recipe, the ratio of rubber solids to soap solids in the saturant recipe is of the order of 20 to 1 to 50 to 1 of rubber to soap so that the resultant rubber-soap film exhibits rubber-like properties.

In like manner, rigid in situ foams may be prepared by incorporating high styrene content latexes, or hard acrylic latexes into the saturant recipes. Semi-rigid in situ foams can be prepared from blends of acrylic or styrene latexes with rubber latexes. Polyvinyl chloride latexes, phenolic resins, starches, etc., may also be incorporated into the saturant to produce a product with the desired end use properties.

While soaps alone, i.e., without any bonding agent, may be employed to form the inter-connected cellular phase and produce a soft flexible product, such a product has low tensile strength and resiliency and only limited use, such as packaging delicate instruments or as a means of protecting polished surfaces.

When elastomeric resins are utilized as the binding material in the cellular phase, the resultant products possess characteristics commonly associated with foamed rubber, including flexibility, resilience, and a soft, but firm, feel. The combination of fibers and elastomer provide good tear resistance nad sufficient toughness to enable the material to be sewed while having good dimensional stability and resistance to distortion in both longitudinal and cross directions.

When non-elastomeric resins are utilized as the binding material in the cellular phase, rigid foam-fiber structures of low density and high strength are produced which are useful as insulation, wall board, structural laminates and the like.

The type of base web used is important to the invention and may be described as "low-bonded." The term "low-bonded" as used herein generally refers to a water-formed sheet of cellulosic fibers having a low degree of fiber-to-fiber bonding, very low density, and essentially no wet strength. The low degree of fiber bonding is obtained by properly combining a suitable method of sheet manufacture with the selection of special kinds of fiber. While the preferred method for manufacturing the low-bonded web is by water-forming on a paper machine as further described herein, unbonded non-woven webs which are made on a card or airlaying apparatus may be used, as long as the resulting web remains substantially unbonded.

For waterforming, the preferred fibers are cellulosic fibers treated to provide a high alpha cellulose content. Conventionally these fibers are obtained from cotton or softwood pulps which have been subjected to varying ranges of caustic extraction and may be either bleached or unbleached. The treatment consists in extracting pulp during or after bleaching with relatively concentrated alkali at temperatures up to 100° C. This treatment reduces hemicelluloses, degradation products, pentosans, and resins. The resulting fibers do not hydrate easily, and when substantially unrefined have low fiber-to-fiber bonding properties. Pulps subjected to mild caustic extraction are lower in alpha cellulose than pulps subjected to strong caustic extraction. Generally, the higher the alpha content of the pulp, the lower the fiber-to-fiber bonding in the sheets produced therefrom. Kraft or sulfate pulps obtained from long-fibered softwoods, when treated with a higher concentration of caustic than normally is employed in the alpha treatment process, exhibit still lower degrees of fiber-to-fiber bonding and are especially well-suited to the production of low-bonded papers employed herein. Kraft or sulfate pulps are preferred over similarly treated sulfite pulps. A lesser degree of fiber-to-fiber bonding is obtained if both fiber refining, and wet pressing of the formed sheet is minimized.

The degree of fiber bonding in a web may be determined by measuring apparent density, and wet and dry tensile sum per pound.

Apparent density is determined by dividing the basis weight of the web by its caliper to yield the ream weight in pounds per mil of thickness. Basis weight is the weight in pounds per 17" x 22" 500 sheets ream weighed at 50% relative humidity and 72° F. (Tappi Method T 410 m–45.) Caliper is the thickness of a single sheet of paper expressed in mils or thousandths of an inch (Tappi Method T 411 m–44 also ASTM standard D 645—58 T Method C).

Tensile sum per pound is an index obtained by dividing the sum of machine and cross direction tensile strength expressed in kg./15 mm. by the basis weight in pounds (Tappi Method T 404 m–50). Wet tensile sum is the same measurement made after soaking the sheet in water.

Webs having an apparent density range of 1.0 to 2.3 are suitable for use. The preferred apparent density range is 1.5 to 2.1.

Webs having a dry tensile sum per pound of 0.04 to 0.23 are suitable for use, with a range of 0.08 to 0.15 preferred. Wet tensile sum per pound should be in the range of 0.0005 to 0.0060 with 0.002 to 0.0054 preferred.

The preferred low-bonded webs are manufactured by forming a sheet from an aqueous suspension of substantially unrefined fibers of high alpha-cellulose content and subjecting the formed sheet to a minimum of wet pressing before drying. To increase the bonding slightly, but still remain within the specified limits, the fibers before forming may be refined lightly by means of a conventional refiner, such as a Jordan engine, to a degree consistent with the type of formation and degree of bonding desired.

Table I lists the properties of typical papers made in the above manner which are suitable for use in this invention.

The invention is primarily concerned with the use of cellulose fibers of papermaking length, although low degrees of bonding may be obtained by selective introduction into the base sheet of hydrophobic fibers such as nylon, Orlon, Dacron, Vinyon, Dynel, glass, mineral fibers, and

TABLE I.—TYPICAL LOW-BONDED SHEETS

| Fibers Used | Mild Alkaline Cooked, and Hypochlorite Bleached, Cotton Linters | | Kraft Pulped Spruce Fiber, Bleached, Conventional Alpha Treatment | Kraft Pulped Spruce Fiber, Bleached, Strong Caustic Extraction | | | | Kraft Pulped Spruce Fiber, Unbleached, Strong Caustic Extraction |
| --- | --- | --- | --- | --- | --- | --- | --- | --- |
| Basis weight | 31.1 | 16.6 | 36.5 | 34.9 | 16.6 | 25.5 | 34.3 | 38.5 |
| Caliper in mils | 30.5 | 13.0 | 23.7 | 19.3 | 8.3 | 12.9 | 16.8 | 18.4 |
| Apparent density (basis wt./caliper) | 1.02 | 1.28 | 1.54 | 1.81 | 2.00 | 1.98 | 2.04 | 2.09 |
| Dry tensile, sum per lb | 0.10 | 0.10 | 0.08 | 0.08 | 0.08 | 0.08 | 0.10 | 0.09 |
| Wet tensile, sum per lb | 0.0005 | 0.0007 | 0.0053 | 0.0047 | 0.0040 | 0.0048 | 0.0051 | 0.0054 | the like. As noted above, caustic-treated pulps exhibit lower degrees of fiber-to-fiber bonding than untreated pulps.

Wet tensile strength of the base paper from which the wet, tensile sum derives, is quite critical. If a base paper has inherent wet strength, it will not be weakened enough by the aqueous impregnation used herein, and most of the strong fiber-to-fiber bonds will remain intact and prevent expansion during the blowing operation. Similarly, sheets having too low a wet tensile sum will permit expansion to take place too rapidly during blowing with attendant collapse of the over-expanded structure in random areas resulting in an undesirable non-uniformly expanded sheet. Optimum results are obtained when papers having a wet tensile sum within the preferred range are employed.

When the fiber-to-fiber bonding in the base sheet is within the preferred range the saturant physically intrudes between fibers during saturation and forms continuous bridges therebetween after foaming and setting. When elastomeric saturants are employed, the fibers are believed to act as flexibly joined structural members to cooperate with the foamed binder and give the product dimensional stability without detracting from its resilience. The fibers also act as a reinforcing filler and permit the production of low-density structures with a minimum of expensive resin.

Microscopic examination of the finished product shows the majority of the fibers to be embedded in the bubble walls. A minority of fibers protrude into bubble cavities, but it is noted that these fibers too are entirely coated with the binder material making up the walls of the cavity.

Suitable wet gel-forming materials include conventional soluble soaps capable of being insolubilized by acids such as ordinary commercially available soap flakes, potassium oleate, ammonium and potassium stearate, potassium palmitate, potassium ricinoleate (potassium soap of castor oil), rosin soaps such as sodium abietate, sodium-N-methyl-N-taurate (sodium soap of coconut oil); surface active agents such as ammonium caseinate and saponin; and various soluble salts of cellulose such as carboxymethylcellulose.

Materials suitable for use as binding material in combination with the wet gel-former include thermoplastic and thermosetting elastomers such as natural and synthetic latices, or mixtures thereof, and thermosetting resins such as formaldehyde resins. Included among the suitable synthetic rubber latices are butadiene polymers consisting of aqueous emulsion polymerizates of one or a mixture of butadienes-1,3; for example, butadiene-1,3,2-methyl-butadiene-1,3 (isoprene), 2-chlorobutadiene-1,3 (chloroprene), piperylene and 2,3-dimethyl butadiene-1-3, or a mixture of one or more of such butadienes-1,3 with one or more other polymerizable compounds which are capable of forming rubbery copolymers with butadienes-1,3, for example, up to 70% of such mixture of one or more compounds which contain a single $CH_2=C>$ group. Examples of compounds which contain a $CH_2=C>$ group and are copolymerizable with butadienes-1,3 are aryl olefins, such as styrene and vinyl naphtahlene; the alpha olefine carboxylic acids, and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride; and vinyl pyridines. Polymers and copolymers of the above-mentioned acrylic monomers may also be used without polymerization with butadiene.

To impart heat-sealing properties in the finished product thermoplastic resins such as polyvinyl chloride, polystyrene, polyvinylidene chloride, polyvinyl acetate and the like can be physically admixed with the saturant in varying amounts depending upon how much heat-sealability is required. As more of these resins are added, however, the compression set of the resilient material was found to generally increase.

When suitable thermosetting resins for use as binding material in combination with the wet gel-former, such as urea-, phenol-, and melamine-formaldehydes, are employed as binder material, a rigid fiber-reinforced foamed structure is obtained.

Suitable blowing agents include azo-di-carbonamide and aryl sulfonyl hydrazides such as benzenesulfonyl-hydrazide, p,p'-oxy-bis (benzenesulfonylhydrazide), p,p'-methylene-bis (benzenesulfonylhydrazide), and p,p'-thiobis (benzenesulfonylhydrazide). The preferred blowing agent is p,p'-oxy-bis (benzenesulfonylhydrazide) marketed under the trademark Celogen by the Naugatuck Chemical Division of the U.S. Rubber Co.

The above blowing agents ordinarily decompose and liberate nitrogen at a temperature ranging from about 150° C. to 205° C. However, when used in aqueous media and especially in alkaline aqueous media, such as any of the above-mentioned rubber latices, decomposition takes place at much lower temperatures in the range of about 70° C. to 130° C. Other medium temperature gas-releasing agents such as sodium bicarbonate, sodium and ammonium carbonate, ammonium hydroxide, ammonia and complex ammonia salts, and mixtures of biuret and urea also can be employed. If acid is not released coincidentally with the gas, as occurs with the preferred gas-releasing agent, supplementary gelling agents such as zinc ammonia sulfate, zinc ammonia acetate, or other complex metallic ammonia salts will aid in precipitating the latex and setting up the gel structure. These supplementary gelling agents may also be used in conjunction with acid releasers to speed up the insolubilization reaction.

In preparing cured products when latices are included in the saturant the usual vulcanization accelerators and ultra accelerators will shorten the curing time required. These include zinc mercaptobenzothiazole, zinc diethyl dithiocarbamate, zinc dimethyl dithiocarbamate, zinc dibutyl dithiocarbamate, selenium dimethyl- or diethylcarbamate, tetramethylthiuram monosulfide, tetrabutylthiuram monosulfide, tetramethylthiuram disulfide, tetraethylthiuram disulfide, etc.

Suitable antioxidants include 2,2' methylene bis (4-methyl-6-tert-butyl phenol), sym-dinaphthyl-p-phenylenediamine, and polybutylated bis phenol A.

Suitable gelation accelerators include inorganic compounds such as zinc ammonia sulfate, zinc ammonia acetate, chromium ammonia nitrate, copper ammonia chloride, sodium fluosilicate, and polyvinyl methyl ether.

Suitable foam stabilizers are alkylpoly (ethyleneoxy) ethanol and polyvinylpyrrolidone.

When employing low-bonded papers with an apparent density range of 1.0 to 2.3 and a saturant containing 2 to 60% solids, the amount of saturant retained by the base paper ranged from about 3 to 600 parts by weight of saturant solids per 100 parts by weight of dry fiber. The upper limit of retained saturant depends upon the original density of the base sheet and the total solids content of the saturant. However, since the saturant is relatively more expensive than the fibers in the base sheet, it is preferred to use as little saturant as possible with respect to the amount of fibers present, consistent with the properties desired in the finished sheet.

Densities of finished products produced by this process have ranged from about 2.3 to 16 pounds per cubic foot. From an economic standpoint, the less dense products are more desirable if other properties meet the requirements of their particular use.

FIG. 2 illustrates one apparatus suitable for carrying out the invention.

A low-bonded base paper 11 is fed from supply roll 12 onto an endless wire supporting screen 14 which carries the paper 11 to nip 16 bringing it into contact with a revolving wire-mesh cylinder 18. The supporting screen 14 is necessary, otherwise the low-bonded paper 11 tends to disintegrate during saturation. Cylinder 18 is driven as is endless wire screen 14 which holds the paper against cylinder 18 during saturation. Saturant is supplied to the interior of wire mesh cylinder 18 through hollow supply tube 20 having an axially-extending slotted opening 22. Sufficient saturant is continuously supplied through tube 20 to provide a constant level of saturant 26 in vat 24.

A small clearance is maintained between cylinder 18 and vat 24. The saturated sheet is pressed at nip 27 between cylinder roll 18 and press roll 28 with excess saturant being retained within hollow wire-mesh cylinder 18. A vacuum box 30 is used to remove additional saturant from the sheet. The amount of pressure applied at 27 is adjustable and the amount of suction applied at 30 can also be regulated. Sheets of suitable length may then be cut from saturated web 32 as it leaves the impregnator. These sheets are heated in a steam-saturated atmosphere for about two minutes, or sufficiently long to uniformly foam and expand the material, while insolubilizing the gel-former. Temperatures in the steam oven may be on the order of 190° to 260° F., with 212° to 216° F. preferred. The foamed material is then further dried and cured in an air-heated oven at temperatures of about 225° to 300° F., employing conventional time-temperature relationships.

Alternately, the saturated web may be run continuously through a steam oven and then a drying oven and reeled up in roll form. The roll may then be further cured in an air heated oven.

The specific examples which follow will more clearly illustrate various aspects of the invention and are given for purposes of illustration rather than limitation.

*Example employing soap without binder*

The following example illustrates the effect of in situ foaming of a low-bonded fibrous base sheet employing soap alone as the interconnecting cellular phase.

Low-bonded paper having a basis weight of 34.3, a caliper of 16.8 mils, an apparent density of 2.04, a dry tensile sum per pound of 0.104, and a wet tensile sum per pound of 0.0051 was saturated with an aqueous solution containing 4% soap, 1% Celogen (p,p'-oxy-bis(benzenesulfonylhydrazide)), 1.6% zinc ammonia sulfate, and .8% nonionic soap. Excess saturant was drained off and the saturated sheet exposed to a temperature of 212° F. in a steam-saturated oven to activate the blowing agent and expand the sheet by foaming. The foamed sheet was removed and dried in an air-heated oven maintained at about 250° F. The resulting product had a caliper of 140 mils and a density of 3.1 pounds per cubic foot. Analysis showed the sheet to be comprised of about 74% fiber and 26% saturant solids. The sheet was uniformly expanded, had a soft uniform texture, and while it had little tensile strength was found suitable for use as a pad for protecting fine finishes or for packaging delicate instruments.

*Example employing buna-N elastomeric binder without added soap*

The low-bonded paper of the previous example was saturated with a 44% aqueous suspension of the following formula:

| Compound: | Parts by weight |
|---|---|
| Buna-N latex [1] | 100 |
| Zinc oxide | 3 |
| Sulfur | 1 |
| Antioxidant [2] | 1 |
| Vulcanization accelerator A [3] | 0.5 |
| Vulcanization accelerator B [4] | 1.5 |
| Foaming agent [5] | 2 |

[1] Butadiene-acrylonitrile copolymer with 68.5% butadiene, 31.5% acrylonitrile.
[2] 2,2'-methylene bis (4-methyl-6-tert-butyl phenol).
[3] Methyl Zimate—zinc dimethyldithiocarbamate.
[4] Zetax—zinc salt of 2-mercaptobenzothiazole.
[5] "Celogen"—p,p'-oxybis (benzenesulfonylhydrazide).

Excess saturant was removed and the saturated sheet laid on a piece of Teflon-coated glass fabric, placed in a steam-saturated oven, where it was foamed in situ by activation of the blowing agent. Wet steam at 30 p.s.i.g. throttled down to atmospheric pressure was used. After removal from the steam oven, the foamed product was stripped from the Teflon-coated supporting fabric, and dried and cured for 20 minutes in an air-heated oven maintained at a temperature of 221° F. The resulting product had a caliper of about 314 mils in its thickest portion but was found to have an uneven distribution of thick and thin areas. In the thick areas large bubbles or pores existed, while in the thin areas, the bubbles had either collapsed or none were produced. The disparaties in thickness made this product unsatisfactory.

*Example employing buna-N elastomeric binder with soap added*

A saturant was prepared as in the previous example except that soap was added in the amount of 3%. Low-bonded paper was saturated with the modified saturant and foamed in situ as in the previous example.

The resulting product had a uniform caliper of about 375 mils and a density of about 3.1 lbs. per cubic foot. The pores were evenly distributed throughout the mass. Analysis showed the foamed sheet contained about 22% fiber and 78% binder. The product was very flexible and resilient, had a high tensile strength, could be sewed, and exhibited good scuff resistance. It was found to be useful as padding in auto trim panels, furniture, and carpet underlayment.

*Example employing hard acrylate with soap added*

The low-bonded paper of the previous examples was saturated with a 45% aqueous suspension of the following formula:

| Compound: | Parts by weight |
|---|---|
| Hard acrylate copolymer [1] | 100 |
| Ammonia | |
| Foaming agent (Celogen) | 4 |
| Soap | 3 |

[1] Ethyl acrylate-methyl methacrylate-methacrylamide copolymer and methylated melamine formaldehyde resin and triethanolamine.

The product was foamed in situ as previously. The resulting foamed sheet had a rigid structure with uniform pore size. Finished caliper was 220 mils and density was about 7.4 lbs. per cubic foot. Analysis showed the product contained about 26% fiber and 74% binder. The product is useful as a rigid insulation material.

*Example employing vinyl latex binder with soap added*

The low-bonded paper of the previous example was saturated with a 44% aqueous suspension of the following formula:

| Compound: | Parts by weight |
|---|---|
| Polyvinyl chloride latex | 100 |
| Nonionic soap | 1 |
| Foaming agent (Celogen) | 4 |
| Soap | 3 |
| $Zn(NH_3)_4SO_4$ | 1 |
| Sulfur | 2 |
| ZnO | 7.5 |

The product was foamed in situ and resulted in a semi-rigid structure of uniform pore size with a caliper of about 375 mils, and a density of about 4.4 lbs. per cubic foot. Analysis showed the product contained about 19% fiber and 81% binder. The semi-rigid product is useful as padding and insulation.

*Example employing butadiene-styrene-binder with soap added*

The low-bonded paper of the previous example was saturated with a 53% aqueous suspension of the following formula:

| Compound: | Parts by weight |
|---|---|
| Butadiene-styrene latex [1] | 100 |
| Ammonia | 0.4 |
| Soap | 2.0 |
| Zinc oxide | 5.0 |
| Sulfur | 2.0 |
| Antioxidant | 1.0 |
| Vulcanization accelerator A | 1.0 |
| Vulcanization accelerator B | 1.0 |
| Foaming agent (Celogen) | 2.0 |

[1] Standard government recipe for SBR latex containing about 25% styrene.

The product was foamed in situ and resulted in a flexible structure of uniform pore size with a caliper of about 375 mils and a density of about 3.4 lbs. per cubic foot. Analysis showed the product contained about 18% fiber and 82% binder. The product was useful as padding material.

It is understood that various modifications may be made in the process without departing from the principles underlying the invention.

What is claimed is:

1. A process for manufacturing a low density, foam-fiber product which comprises forming a low-bonded fiber sheet, said sheet having an apparent density in the range of about 1.0 to 2.3, a dry tensile sum per pound in the range of about 0.04 to 0.23, and a wet tensile sum per pound of about 0.0005 to 0.0060; saturating said sheet with an aqueous dispersion to substantially release the fiber-to-fiber bonds in said sheet, said saturant containing minor amounts of a wet gel-forming material, a heat-activatable gas-forming agent, and a heat-activatable insolubilization agent for said wet gel-forming material; gradually heating said saturated sheet in a moist atmosphere first to a temperature sufficient to activate said gas-forming agent and thereby form with said gel-forming agent a foam during which formation the individual fibers in said sheet are caused to separate from each other and become suspended in the wall of the cells comprising said foam; then further increasing the temperature of said foam-fiber suspension to about 190° F. to 260° F. to activate said insolubilization agent to cause said foamed gel-forming agent to insolubilize and retain said separated fibers embedded within the walls of the foamed structure; and subsequently drying said foam-fiber combination to set the foamed structure in its expanded condition.

2. The process of claim 1 in which the fibers are of papermaking length.

3. The process of claim 1 in which the fibers are cellulose fibers of high alpha cellulose content.

4. The process of claim 1 in which the wet gel-forming material is selected from the group consisting of potassium oleate, ammonium and potassium stearate, potassium palmitate, potassium ricinoleate, sodium abietate, sodium - N - methyl - N - taurate, ammonium caseinate, saponin, and carboxymethyl of cellulose.

5. The process of claim 1 in which the aqueous dispersion also contains a binder material.

6. The process of claim 5 in which the binder material is an elastomeric polymer.

7. The process of Claim 5 in which the binder is a thermosetting polymer.

References Cited by the Examiner

UNITED STATES PATENTS

| 1,777,247 | 9/1930 | Bayer | 106—122 |
| 2,917,405 | 12/1959 | Gaylord | 117—140 X |
| 2,926,104 | 2/1960 | Goetz | 117—119.8 X |
| 2,972,554 | 2/1961 | Muskat et al. | 117—140 X |
| 3,041,193 | 6/1962 | Hamway et al. | 117—11 |

WILLIAM D. MARTIN, *Primary Examiner.*

H. W. MYLIUS, M. LUSIGNAN, *Assistant Examiners.*